Sept. 10, 1940.      J. J. EPPENSTEINER      2,214,228
CAMERA
Filed March 20, 1939          2 Sheets-Sheet 1

Inventor
John J. Eppensteiner
by Rippey & Cassidy
His Attorneys

Sept. 10, 1940.  J. J. EPPENSTEINER  2,214,228
CAMERA
Filed March 20, 1939   2 Sheets-Sheet 2

Inventor
John J. Eppensteiner
by Rippey & Cassidy
His Attorneys.

Patented Sept. 10, 1940

2,214,228

UNITED STATES PATENT OFFICE 2,214,228

CAMERA

John J. Eppensteiner, St. Louis, Mo.

Application March 20, 1939, Serial No. 262,853

6 Claims. (Cl. 95—18)

This invention relates to cameras; and has special reference to cameras having means for obtaining a number of negatives in spaced relationship upon the same film at the same time.

Objects of the invention are to provide a camera having means for obtaining simultaneously and by one focusing adjustment of the camera a number of negatives in spaced relationship upon the same film; to provide a camera having a plurality of lenses supported in laterally spaced relationship upon parallel axes and at different distances from the film so that focusing may be accomplished at the same time by the use of the three lenses to obtain three negatives, one of which should have the image in approximately perfect focus; and to provide improved means for adjusting the lenses simultaneously with respect to the film in order to bring at least one of the lenses into approximately perfect focus.

Another object of the invention is to provide improved means for moving or adjusting a plurality of lenses relative to a film so as to locate the different lenses at different distances from the film and bring one of them at least into approximately perfect focus without the necessity of exercising that care and precision which is necessary to obtain a perfect negative by use of a single lens camera.

Another object of the invention is to provide improved means for adjusting the shutters in the respective lenses uniformly and simultaneously as required for proper operation and use of the camera including the plurality of lenses.

Another object of the invention is to provide a camera equipped with means for obtaining a plurality of negatives from different focal distances at the same time in order to assure that one of the negatives will be approximately perfect.

Various other objects and advantages of the invention will be apparent from the following description, reference being made to the annexed drawings, in which—

Figure 1:
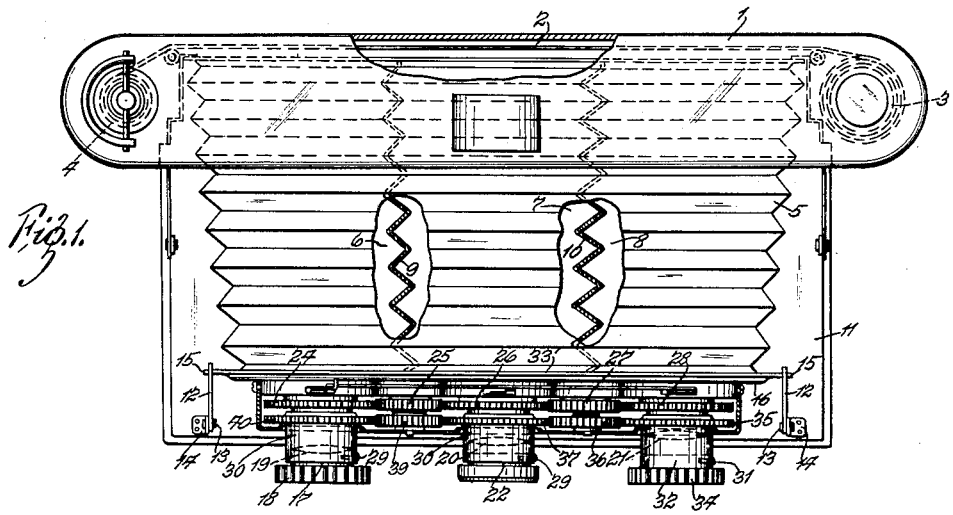
Fig. 1 is a plan view with parts in section of my improved camera.

The casing 1 of the camera is of usual and known construction, with the exception that it is considerably longer than usual. The film 2 is unwound from one spool 3 and wound onto another spool 4 and passes along the inner side of the rear of the casing. In the present instance, the bellows 5 provides an enclosure which is divided into compartments 6, 7 and 8 by bellows partitions 9 and 10. Each of the compartments 6, 7 and 8 is served by a separate lens so that, in this specific embodiment of the invention, three negatives are obtained at the same time, although the invention may be varied so as to obtain different numbers of negatives, as desired.

The casing 1 is provided with a door 11 to open and to close the front side thereof and to support the forward end of the bellows and the attached lenses when the camera is open for use. This type of camera is provided with arms 12 having their lower ends permanently connected by pivots 13 with brackets 14 attached to the door 11 and adapted to be engaged with projections 15 in connection with the forward end 16 of the bellows.

Figure 2:
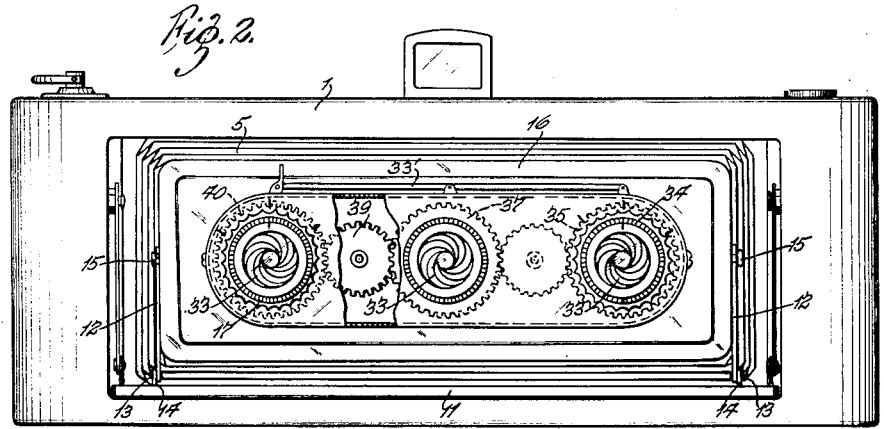
Fig. 2 is a front elevation.
Figures 5, 7:
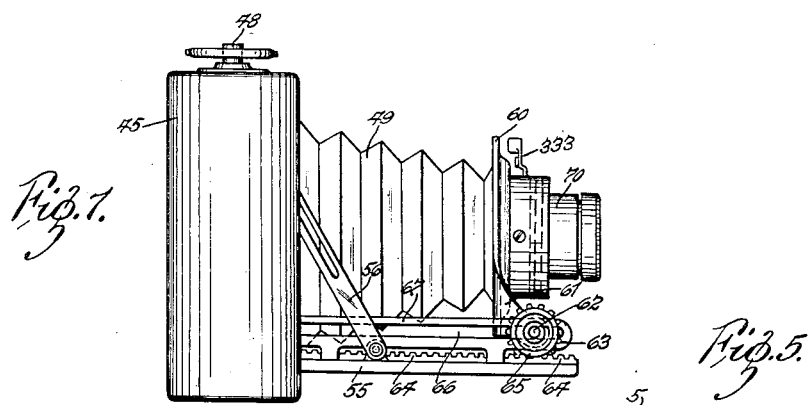
Fig. 5 is an enlarged sectional view showing the gearing for focusing the lenses simultaneously and adjusting the shutters of the different lenses to conform to the focal adjustments thereof.
Fig. 7 is a side elevation of the camera shown in Fig. 6.

In the embodiment of the invention shown in Figs. 1, 2 and 5, the lens within the tube 17 is moved toward and from the film 2 by turning a rotary ring 18, attached to the forward end of the tube 17, in the usual manner so as to form a negative upon that portion of the film 2 at the rear end of the compartment 6. The lens 19 within the tube 17 is on an axis parallel with the axis of the lens 20 and parallel with the axis of the lens 21 within the tubes 22 and 23, respectively, but these lenses 19, 20, and 21 are at different distances from the film 2. My invention comprises means for focusing these lenses in synchronism and maintaining the same focusing ratio thereof.

The rear end of the tube 18 has an annular rack or pinion 24 attached thereto for focusing the lenses 20 and 21 when the lens 19 is adjusted for focusing. The pinion 24 meshes with an idler pinion 25 which meshes with an annular pinion 26 attached to the rear end of the tube 22; and the annular pinion 26 meshes with an idler pinion 27 which meshes with an annular pinion 28 attached to the rear end of the tube 23. Thus the lens tubes 17, 22, and 23 are rotated together and equally by turning of the ring 18. Movement of the lenses 19 and 20 toward and from the film 2 in focusing is effected by the usual pin and slot devices 29 connecting the tubes 17 and 22 with their supporting tubes 30; and movement of the lens 21 toward and from the film 2 in focusing is effected by a similar pin and slot device 31 connecting the rotary tube 32 with the enclosed tube 23. Thus, it will be seen that these parts of my invention are embodied in a camera provided with a number of bellows compartments conforming, respectively, to the lenses at the front of the bellows compartments. Focusing is accomplished simultaneously so as to obtain three negatives in spaced relationship upon the same film at the same time.

The camera comprises the usual shutters 33, and the usual device 33' for adjusting the shutters of one lens, and connected in this instance with the shutters of all the lenses, so that all shutters may be simultaneously adjusted for familiar purposes. For simultaneous adjustment of the usual diaphragm, a ring knob 34 is attached to the end of the tube 32 for rotating the same to adjust the corresponding diaphragm in the usual manner. An annular pinion 35 is attached to the tube 32 and, through an intermeshed idler pinion 36 and an annular pinion 37, rotates the tube 30 for adjusting the corresponding diaphragm. The annular pinion 37, through an intermeshed idler pinion 39 and an annular pinion 40, rotates the tube 30 to adjust the corresponding diaphragm in the usual manner. Thus, all of the diaphragms corresponding to the respective lenses are adjusted simultaneously in order to obtain proper effects through all of the lenses.

Figure 3:
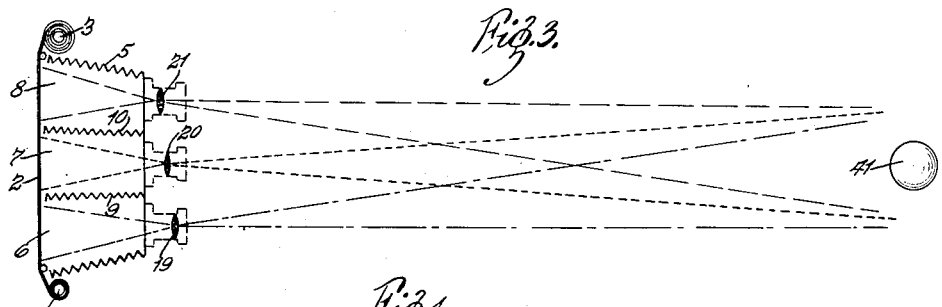
Fig. 3 is a diagrammatic view illustrating the effect of focusing the camera upon an object to be photographed.
Figure 4:
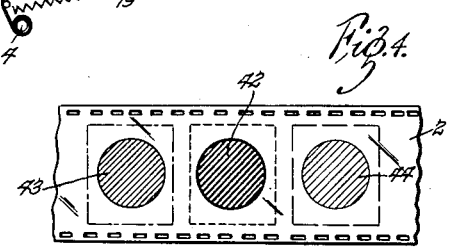
Fig. 4 is a view illustrating diagrammatically the negatives obtained through the lenses at different distances from the film and the object to be photographed.

It is now clear that, by use of this invention embodied in any familiar type of camera, a number of negatives are obtained at the same time upon the same film. In use, the operator adjusts the camera for operation at the assumed distance from the person or object 41 (Fig. 3) to be photographed; to overcome and eliminate the frequent miscalculations of distances, this invention produces a number of negatives simultaneously, one of which at least will correct any intolerance or any inaccuracy in the estimate made by the operator, and should photograph the person or object at approximately the proper distance. The remaining negatives may be imperfect. This is emphasized by Fig. 4 of the drawings, where the negative 42 formed on the film 2 through the middle lens 20 is an approximately perfect negative because said lens 20 is accurately focused; whereas the negative 43 and the negative 44 are both imperfect because the focusing of the lenses 19 and 21 was inaccurate, the lens 19 being at a greater distance from the film 2 than the lens 20 and the lens 21 being nearer the film 2 than the lens 20. This adjustment of the lenses for focusing is obtained while the bellows 5 remains fully extended.

Figure 6:
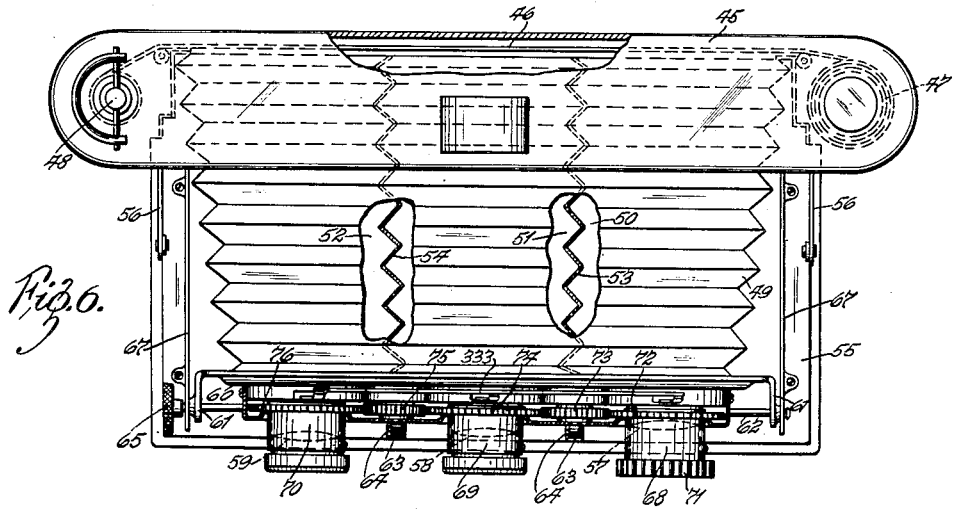
Fig. 6 is a plan view with parts in section of a camera in which the bellows is expanded or contracted in obtaining focus.

In the variation of the invention shown in Figs. 6 and 7, the adjustment of the lenses toward and from the film is obtained by extending or contracting the bellows.

In this form of the invention, the casing 45 is longer than usual and is otherwise of familiar construction. The film 46 passes from one spool 47 to another spool 48 within the rear of the casing. The enclosure provided by the bellows 49 is divided into compartments 50, 51, and 52 by partitions 53 and 54, each of said compartments being served by a separate lens whereby separate spaced negatives are obtained at the same time upon the same film. The casing includes a door 55 which opens and closes the front side of the casing and supports the forward end of the bellows and the attached lenses when the camera is open. The door is supported in its horizontally extended position by links 56.

The lenses 57, 58, and 59 for the compartments 50, 51, and 52 are supported upon parallel axes and at different distances from the film 46. Movement of the lenses toward and from the film 46 in focusing is effected by contracting and extending the bellows 49 since the lens devices are attached to and supported by the forward end of said bellows.

The front wall 60 of the bellows 49 has forwardly extended arms 61 in which a horizontal shaft or spindle 62 is rotatively supported. Pinions 63 are attached to the shaft or spindle 62 and mesh with parallel racks 64 attached to the door 55. A knurled knob 65 is attached to one end of the shaft or spindle 62 and constitutes a handle or device for manual engagement to rotate the shaft or spindle 62 and thereby contract or extend the bellows 49. The ends of the shaft or spindle 62 extend through slots 66 in guides 67 attached to the door 55 to guide the bellows in its adjustments and prevent undue oscillation thereof.

As stated, the lenses 57, 58, and 59 are supported on parallel axes and at different distances from the film 46. In using the camera, it is necessary to focus the device properly as to distance, to adjust the shutters, such as the shutters 33, by a device 333 just like the device 33', and to adjust the diaphragms. In this embodiment of the invention, in which distance focusing for all of the lenses is obtained by contracting or extending the bellows 49, adjustment of the diaphragms may be effected in any adjusted position of the lenses with respect to the film 46. The diaphragms are adjusted by usual connections from the tubes 68, 69, and 70, one such connection being contained in familiar one-lens cameras. This is to say that the connections whereby the respective tubes 68, 69, and 70 operate the corresponding diaphragms are familiar connections, as the connections from the tubes 30 and 32 for operating the diaphragms are familiar and are not herein specifically shown. It is sufficient for present purposes to illustrate the means whereby the tubes 68, 69, and 70 are simultaneously rotated to effect uniform and simultaneous operation and adjustment of the diaphragms.

As shown, the tube 68 is provided with a knurled knob or handle 71 on its forward end for manual engagement to rotate said tube in order to adjust the diaphragms for the enclosed lens 57. An annular pinion 72 engages an idler pinion 73 which meshes with an annular pinion 74 attached to the tube 69 and which, in turn, meshes with an idler pinion 75 engaging an annular pinion 76 attached to the tube 70. Thus, by this arrangement of gearing, rotation of the tube 68 to adjust the diaphragms controlled thereby, will simultaneously and uniformly rotate the tubes 69 and 70 to effect simultaneous and uniform adjustment of the diaphragms controlled by said tubes. According to this invention, the diaphragms may be accurately and uniformly operated and adjusted for cooperation with the plurality of focusing lenses, irrespective of the manner or means by which the lenses are moved toward and from the film in focusing.

Figure 8:
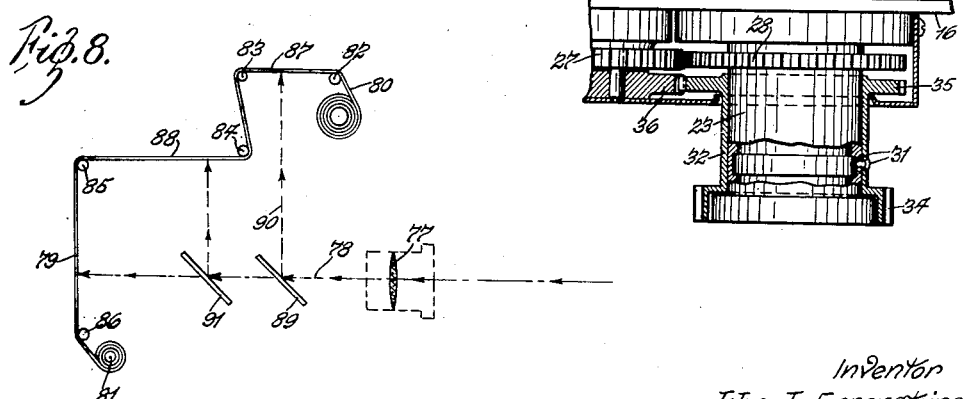
Fig. 8 is a view illustrating diagrammatically an embodiment of the invention using a single lens and a number of mirrors to reflect images in spaced relationship to a single film.

The invention as illustrated in Fig. 8 is embodied in a camera having a single lens 77 movable along an axis 78 normal to the part 79 of the film when said lens is moved to focus the camera. The film is unwound from a spool 80 and wound on another spool 81, or vice versa. The film operates against spaced idler rollers 82, 83, 84, 85, and 86, so that the axis 78 of the lens 77 is always normal to said film part 79 and the film parts 87 and 88 are always parallel with said axis 78. A mirror 89 is mounted obliquely across the axis 78. This mirror is generally of the type known and used in color photography, so that the image and approximately one-third of the light volume are reflected from the mirror along the plane of the line 90 to the part 87 of the film. This mirror is spaced from the part 79 of the film a distance approximately equal to the distance from the reflecting surface of the mirror to the film part 87. The distance of the mirror 89 from the film part 87 may be varied somewhat more or less than the distance from said mirror 89 to the film part 79.

Another mirror 91 parallel with the mirror 89 is mounted obliquely across the axis line 78 between said mirror 89 and the film part 79 and approximately equidistant from the film parts 79 and 88. The image and approximately one-third of the light are reflected by the mirror 91 against the film part 88 while the remaining light and image pass to the film part 79. These mirrors are constructed and arranged in such ratio that the mirror 89 reflects approximately one-third of the light and the image onto the film part 87, the mirror 91 reflects approximately one-half of the remaining light and the image onto the film part 88, and the remainder of the light and the image pass to the film part 79. Thus, by use of this device, a number of negatives from the same lens are obtained at the same time, the differences in the optical paths from the lens to the different portions of the film being such that at least one of the negatives should be correct and distinct, irrespective of any slight error as to distance in focusing the camera.

The foregoing description of the different embodiments of the invention includes a description of the operation and adjustment of the cameras when the lenses are moved to focus the cameras. Focusing of the camera shown in Figs. 1 and 2 is effected merely by turning the annular knob 18 without extending or contracting the bellows 5. Focusing of the camera shown in Figs. 6 and 7 is effected by turning the shaft or spindle 62 to extend or contract the bellows 47 as required to obtain proper focus. Focusing of the device shown in Fig. 8 is effected by moving the lens 77 in the usual manner until appropriate focus is obtained.

By use of any of these embodiments of the invention, three negatives are obtained at the same time simply by focusing the camera for the selected operation at the assumed distance from the person or object to be photographed. However, the invention is not restricted to the formation of three negatives at the same time, but may be varied in this and other particulars without departure from the nature and principle thereof.

I claim:

1. In a camera having a casing, an extendible and retractable bellows attached to and cooperating with the casing to form a light-proof enclosure, foldable partitions within said bellows dividing said enclosure into separate light-proof compartments, and a film movable across the rear inner side of the casing and across said compartments; a plurality of substantially identical lenses at the front of said compartments on parallel axes and located at different distances from the film when said bellows is extended, and mechanism for moving said lenses simultaneously and uniformly toward and from said film to focus the camera and simultaneously obtain a plurality of negatives.

2. In a camera having a casing, an extendible and retractable bellows attached to and cooperating with the casing to form a light-proof enclosure, foldable partitions within said bellows dividing said enclosure into separate light-proof compartments, and a film movable across the rear inner side of the casing and across said compartments; a plurality of substantially identical lenses at the front of said compartments on parallel axes and located at different distances from the film when said bellows is extended, mechanism for moving said lenses simultaneously and uniformly toward and from said film to focus the camera and simultaneously obtain a plurality of negatives, and mechanism for simultaneously regulating the amount of light passing into said compartments from said lenses.

3. In a camera having a casing, an extendible and retractable bellows attached to and cooperating with the casing to form a light-proof enclosure, foldable partitions within said enclosure dividing said enclosure into separate light-proof compartments, and a film movable across the rear inner side of said casing and across said compartments; a plurality of substantially identical lenses at the front of said compartments on parallel axes and located at different distances from the film when the bellows is extended for use, and mechanism for moving said lens devices simultaneously and uniformly toward and from said film to focus the camera.

4. In a camera having a casing, an extendible and retractable bellows attached to and cooperating with the casing to form a light-proof enclosure, foldable partitions within said enclosure dividing said enclosure into separate light-proof compartments, and a film movable across the rear inner side of said casing and across said compartments; a plurality of substantially identical lenses at the front of said compartments on parallel axes and located at different distances from the film when the bellows is extended for use, mechanism for moving said lens devices simultaneously and uniformly toward and from said film to focus the camera, and mechanism for simultaneously and uniformly regulating the amount of light passing into said compartments from said lens devices.

5. In a camera having a casing, an extendible and retractable bellows attached to and cooperating with the casing to form a light-proof enclosure, foldable partitions within and dividing said enclosure into separate light-proof compartments, and a film movable across the rear inner side of the casing at the rear ends of said compartments; a plurality of substantially identical lenses at the front of said compartments on parallel axes and located at different distances from said film when said bellows is extended for use, and mechanism supported by said bellows for moving said lens devices simultaneously and uniformly toward and from said film to focus the camera.

6. In a camera having a casing, an extendible and retractable bellows attached to and cooperating with the casing to form a light-proof enclosure, foldable partitions within and dividing said enclosure into separate light-proof compartments, and a film movable across the rear inner side of the casing at the rear ends of said compartments; a plurality of substantially identical lenses at the front of said compartments on parallel axes and located at different distances from said film when said bellows is extended for use, mechanism supported by said bellows for moving said lens devices simultaneously and uniformly toward and from said film to focus the camera, mechanism supported at the front of said compartments for regulating simultaneously and uniformly the amount of light passing into said respective compartments from said lens devices, and a device for operating said mechanism.

JOHN J. EPPENSTEINER.